United States Patent
Lim et al.

(10) Patent No.: US 6,614,484 B1
(45) Date of Patent: Sep. 2, 2003

(54) DEINTERLACING METHOD FOR VIDEO SIGNALS BASED ON EDGE-DIRECTIONAL INTERPOLATION

(75) Inventors: Il Taek Lim, Seoul (KR); Kyoung Won Lim, Seoul (KR); Cheol Hong Min, Seoul (KR)

(73) Assignee: LG Electronics, Inc., Seoul (KR)

( * ) Notice: Subject to any disclaimer, the term of this patent is extended or adjusted under 35 U.S.C. 154(b) by 407 days.

(21) Appl. No.: 09/654,167

(22) Filed: Sep. 1, 2000

(30) Foreign Application Priority Data

Sep. 3, 1999 (KR) .......................... 1999-37265

(51) Int. Cl.[7] ................................ H04N 7/01
(52) U.S. Cl. ...................... 348/448; 348/452
(58) Field of Search .................... 348/452, 448, 348/700; 382/199

(56) References Cited

U.S. PATENT DOCUMENTS

| | | | | |
|---|---|---|---|---|
| 5,532,751 A | * | 7/1996 | Lui | 348/452 |
| 5,786,862 A | * | 7/1998 | Kim et al. | 348/448 |
| 6,181,382 B1 | * | 1/2001 | Kieu et al. | 348/459 |
| 6,239,842 B1 | * | 5/2001 | Segman | 348/448 |

* cited by examiner

Primary Examiner—Victor R. Kostak
(74) Attorney, Agent, or Firm—Fleshner & Kim, LLP

(57) ABSTRACT

A deinterlacing method based on an edge-directional interpolation in a conversion of video signals of an interlaced scanning format into those of a progressive scanning format, in which the unit of interpolation is extended from the unit of one pixel to the unit of one pixel group. An intermediate frame video is formed from an original interlaced field video. Mismatch values associated Keith edge directions are compared, thereby determining four edge directions exhibiting mismatch values less than those of other edge directions. An interpolation pixel value is calculated, using the intermediate video frame, indices of the four edge directions, and indices of the edge directions. A determination is made based on similarities of the four edge directions, differences among the less mismatch values associated with the four edge directions, and differences of the less mismatch values from mismatch values associated with the remaining edge directions.

23 Claims, 6 Drawing Sheets

DEINTERLACING METHOD FOR VIDEO SIGNALS BASED ON EDGE-DIRECTIONAL INTERPOLATION

BACKGROUND OF THE INVENTION

1. Field of the Invention

The present invention relates to a deinterlacing method based on an edge-directional interpolation.

In particular, the present invention relates to a method for converting video signals of an interlaced scanning format into those of a progressive scanning format, that is, a deinterlacing method for video signals.

More particularly, the present invention relates to a deinterlacing method for video signals in which an edge-directional interpolation (EDI) is taken into consideration in a conversion of video signals of an interlaced scanning format into those of a progressive scanning format.

2. Description of the Prior Art

In present television systems, a specific scan format so called an "interlaced scan format" is adopted. In accordance with an interlaced scanning format for NTSC television systems, odd and even lines of 525 scan lines are outputted to a display in an alternating fashion at intervals of a 1/60 second for every picture. On the other hand, odd and even lines of 625 scan lines are outputted to a display in an alternating fashion at intervals of a 1/60 second for every picture in accordance with an interlaced scan format for PAL systems.

Here, respective pictures outputted at intervals of a 1/60 second are referred to as "fields". A complete picture consisting of two fields is referred to as a "frame".

A field consisting of odd scan lines is referred to as an "odd field" or a "top field" whereas a field consisting of even scan lines is referred to as an "even field" or a "bottom field".

The interlaced scan format, in which every frame is outputted to a display in a state divided into two fields, provides an advantage in that it can reduce the bandwidth of TV signals by ½, as compared to a non-interlaced progressive scan format in which all scan lines of every frame are outputted in a 1/60 second.

If TVs of the present NTSC television system, with uses a bandwidth of 6 MHz by virtue of the above mentioned interlaced scan format adopted thereby, did not adopt the interlaced scan format, they would require a bandwidth of about 12 MHz.

In spite of an advantage in that the bandwidth required for signal processing can be reduced, the interlaced scan format involves a drawback in that when a video having horizontal fine line patterns is displayed on a display, those fine line patterns may be chattered at a frame frequency of 30 Hz. That is, a large-area flickering phenomenon may occur.

Where the video displayed on the display contains an object flickering at 30 Hz, there is a problem in that fine line patterns may be viewed in an overlapped state over the object.

The above mentioned phenomena, which result in a degradation in picture quality, are inevitably involved in the interlaced scan format.

However, the advent of digital TV systems has caused picture quality to be considered as a very important factor.

Advanced Television Systems Committee (ATSC) standard for digital TV signals adopts both the progressive scan format and the interlaced scan format.

For instance, TV standard for a size of 704 pels*480 lines adopts a 60 Hz progressive scan format and a 60 Hz interlaced scan format.

In the case of a digital TV receiver adopting a progressive scan format, video signals of an interlaced scan format should be converted into those of a progressive scan format.

On the other hand, where TV signals are to be displayed on the monitor of a PC via a TV receiver card mounted to the PC, it is necessary to convert TV signals of an interlaced scan format into those of a progressive scan format because the monitor can display only videos of the progressive scan format.

Thus, the conversion of video signals from the interlaced scan format into the progressive scan format is essentially required in various cases.

Mainly, there are two methods for the conversion of video signals from the interlaced scan format into the progressive scan format.

The first method is an inter-field interpolation, and the second method is an intra-field interpolation.

A simple example of the inter-field interpolation is a weave method in which one frame is formed by combining one top field and one bottom field.

In accordance with this method, however, horizontal lines disturbing to the eye are formed at a moving portion of the displayed video even though a good display result is obtained in associated with the still portion of the video. This is because there is a timing difference between the two fields.

A more complex example of the inter-field interpolation is a motion-compensated interpolation.

In accordance with the motion-compensated interpolation, motion information is extracted from a frame in order to conduct a desired line interpolation. Based on the extracted motion information, empty lines of the current field are interpolated by the previous field or the further previous field.

In this case, it is important to allow the motion compensation to be accurately carried out.

Meanwhile, a simple example of the intra-field interpolation is a bob method in which one frame is formed using the scanning lines of one field two times.

In accordance with this method, it is possible to prevent horizontal lines disturbing to the eye from being formed at a moving portion of the displayed video. However, there is a complexity in forming frames. Furthermore, the fine portions of the displayed video may be chattered at 30 Hz.

Furthermore, a degradation in vertical resolution is involved in this method. In particular, a distortion in a stepped shape is generated at edge portions of the displayed video.

A more complex example of the intra-field interpolation is an edge-directional interpolation (EDI).

In accordance with this EDI, only the pixels of the current field are used to interpolate the empty lines of the current field. In particular, the directions of edges are detected in order to carry out the interpolation based on the information detected.

Therefore, it is important to detect edge directions accurately.

The present invention is intended to provide an EDI method exhibiting an EDI performance improved over the above mentioned conventional EDI method.

In accordance with the conventional EDI method, the detection of an edge direction is achieved using 6 pixels neighboring to a pixel on a scan line to be interpolated, as shown in FIG. 2a.

The procedure of detecting the direction of an edge is carried out as follows.

First, respective variations in the value of a pixel, to be interpolated, in three directions passing that pixel are detected using 6 pixels Pa, Pb, Pc, Pd, Pe, and Pf neighboring to the pixel Px.

The pixel value variation in each direction is defined by an absolute difference between the pixel values of two neighboring pixels in that direction, as expressed by the following Equation 1:

$AD(45°)=|Pc-Pd|$ $AD(135°)=|Pa-Pf|$ $AD(90°)=|Pb-Pe|$ [Equation 1]

Next, neighboring pixels to be used for the interpolation are determined, based on differences among the detected pixel value variations in respective directions, as expressed by the following Equation 2:

[Equation 2]

$$Px = \frac{(Pa+Pf)}{2}, (|Pc-Pd|\langle|Pc-Pd|) \cap |Pa-Pf|\langle|Pb-Pe|) \quad (1)$$

$$Px = \frac{(Pc+Pd)}{2}, (|Pc-Pd|\langle|Pa-Pf|) \cap |Pc-Pd|\langle|Pb-Pe|) \quad (2)$$

$$Px = \frac{(Pb+Pe)}{2}, (|Pb-Pe|\langle|Pc-Pd|) \cap |Pb-Pe|\langle|Pa-Pf|) \quad (3)$$

In Equation 2, "Px" represents the pixel interpolated. Equation 2 is based on the fact that neighboring pixels in the edge direction in a video exhibit a high correlation, so that they have similar values.

As apparent from the above description, the conventional EDI method is advantageous in that it is simple. However, the conventional EDI method involves several serious problems as follows:

First, the conventional EDI method involves an increased degradation in the accuracy of the edge detection for a video containing an increased amount of noise signal components.

This is because the influence of noise signal components in a video on the calculation of absolute differences increases in that only two pixels are used for the calculation of the absolute difference in each direction.

Second, it may be impossible to accurately detect the edge information in diagonal directions where only video signals of an interlaced scan format are used. This is because there may be a fundamental inaccuracy in the case of FIG. 2b.

FIG. 2b illustrates the absolute difference characteristics of a pixel Px, which is an optional point on a video having the form of a line extending in a direction of 135. In FIG. 2b, "AD(45)" represents the absolute difference between the pixel values of two pixels Pc and Pd, and "AD(135)" represents the absolute difference between the pixel values of two pixels Pa and Pf. In this case, it is impossible to expect accurate edge information because "AD(45)" and "AD(135)" have similar values, respectively.

Third, the number of detectable edge directions in the conventional EDI method is excessively small.

In other words, it is impossible to accurately interpolate all edges passing the pixel Px, to be interpolated, only using the vertical directions of 90 and the diagonal directions of 45 and 135 passing the pixel Px.

Finally, the conventional EDI method may involve an undesirable degradation in resolution, for example, a bluring phenomenon, because the interpolation according to the conventional EDI method is conducted for every pixel.

Due to the above mentioned drawbacks, it is difficult for the conventional EDI method to obtain a good picture quality in the conversion of video signals of an interlaced scanning format into those of a progressive scanning format.

SUMMARY OF THE INVENTION

Therefore, an object of the invention is to provide a deinterlacing method based on an EDI in a conversion of video signals of an interlaced scanning format into those of a progressive scanning format, in which the unit of interpolation is extended from the unit of one pixel to the unit of one pixel group, thereby avoiding a degradation in picture quality from occurring in an edge-directional interpolation.

In order to accurately detect edge information even for a video signal containing noise signal components, a plurality of absolute mismatch values are calculated for each of given edge directions, and averaged in accordance with the present invention. An intermediate frame video is formed from an original interlaced field video in accordance with the present invention. An EDI is applied to the intermediate frame image, thereby ensuring an accurate direction detection even in the case in which the selected edge direction corresponds to a diagonal direction. In order to accurately represent the edge direction passing a pixel, the number of possible edge directions is extended to 33 in accordance with the present invention. The unit of interpolation is extended from the unit of one pixel to the unit of one pixel group in accordance with the present invention, thereby avoiding a degradation in picture quality from occurring in an edge-directional interpolation.

BRIEF DESCRIPTION OF THE DRAWINGS

The above objects, and other features and advantages of the present invention will become more apparent after a reading from the following detailed description when taken in conjunction with the drawings, in which.

DETAILED DESCRIPTION OF THE PREFERRED EMBODIMENTS

The present invention provides an EDI method which solves the problems involved in the above mentioned conventional EDI method, using the following method and based on the basic concepts according to that method.

Figure 5A:
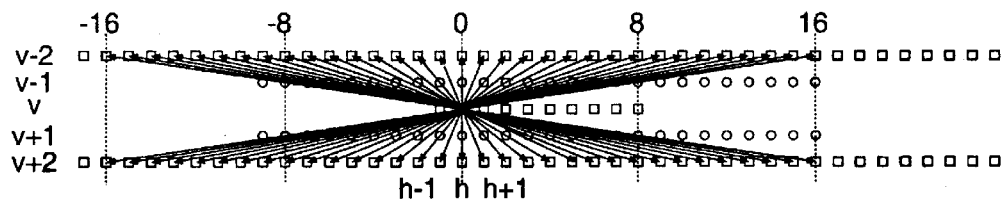
FIG. 5a is a view illustrating an example of a group of edge directions (33 directions) detectable without any side effects in accordance with the present invention.
Figure 5B:
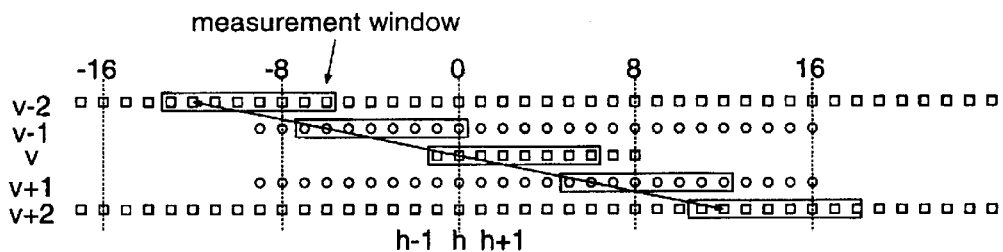
FIG. 5b is a view illustrating a procedure for deriving absolute mismatches in one of the edge directions, shown in FIG. 5a, in accordance with the present invention.

First, in order to achieve a detection of accurate edge information even for a video signal containing noise signal components, a plurality of absolute differences or absolute mismatches are calculated for each of given edge directions, and averaged in accordance with the present invention, as shown in FIG. 5b.

FIG. 5b illustrates the case in which 8 absolute mismatches for each edge direction are calculated and averaged.

The basic concept of this method is based on the fact that most noise signal components are high frequency components due to the characteristics thereof, the fact that the effects of the noise signal components can be filtered by virtue of the procedure of averaging the absolute mismatches because the averaging procedure is a certain low passing filtering, and the fact that the probability of mistaking video portions, other than edge portions, for edge portions is reduced because a wider video region is taken for the detection of edge information.

In accordance with the basic concept, the possible calculation region for an edge passing the pixel Px is extended, and the calculation of the absolute mismatch in each possible direction associated with the extended possible calculation region is conducted.

Second, in order to ensure an accurate detection even for edge directions corresponding to diagonal directions, an intermediate frame video is formed from a field video so that an edge directional interpolation is applied to the intermediate frame video.

Such a frame video is formed by interpolating omitted scan lines in an original interlaced video by use of a simple line averaging filter.

Figure 5C:
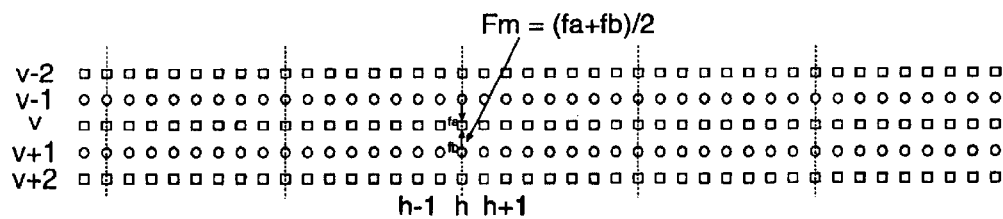
FIG. 5c is a view illustrating a procedure for calculating the values of temporarily-interpolated pixels included in an intermediate frame in accordance with the present invention.

The above mentioned basic concept will now be described in detail, in conjunction with FIG. 5c. Referring to FIG. 5c, an intermediate frame video Fm (Fm=(fa+fb)/2) formed in association with an original interlaced video is illustrated. The intermediate frame video Fm contains temporarily interpolated data of an intermediate color generated between neighboring data portions of the original interlaced video in accordance with a line averaging interpolation. The temporarily interpolated data has the same direction as the original edge direction. Taking into consideration absolute mismatches calculated using the temporarily interpolated data, accordingly, it is possible to eliminate the drawback involved in the case using only an original interlaced video, that is, the impossibility of absolute mismatches in diagonal directions to accurately represent edge directions.

Third, in order to accurately represent the direction of the edge passing the pixel Px, the number of possible directions associated with the edge is increased to 33, as shown in FIG. 5a.

FIG. 5a illustrates an example of a group of edges (totally, in 33 directions) which can be detected in accordance with the present invention, without any side effects.

This third basic concept is based on the fact that if it is possible, on the basis of the above mentioned two concepts, to calculate a relatively accurate absolute mismatch in an optional direction and to appropriately eliminate a degradation in picture quality possibly involved when an inaccurate edge direction is detected, an increased number of edge directions may then be used to accurately represent even pixels existing on optional edges without any side effects.

Fourth, in order to avoid an undesirable degradation in picture quality from occurring in an EDI, this interpolation is not conducted for every pixel, but conducted for every group of pixels. That is, the unit of interpolation is extended from the unit of one pixel, as in the conventional case, to the unit of one pixel group.

This means that if a uniform EDI is carried out for all pixels, having the same direction, on an edge image, it is then possible to avoid a degradation in picture quality resulting from a non-uniform EDI.

Another feature of the present invention is to basically prevent a degradation in picture quality resulting from an interpolation based on direction information erroneously determined, using a procedure for checking the results of the edge direction detection.

This feature is important in that it can realize the above mentioned third concept or feature. The basic concept of this feature will now be described. Assuming that the pixel Px to be interpolated is a pixel on an edge image, the following two conditions are established. The first condition is that the absolute mismatch in a direction similar to the direction associated with the minimum absolute mismatch is less than those of other directions. The second condition is that a more distinct image involves an increased difference between the absolute mismatch value calculated in an edge direction and the absolute mismatch value calculated in a direction other than the edge direction.

The deinterlacing method for video signals based on the EDI having the above mentioned features in accordance with the present invention involves the following procedures:

(a) forming an intermediate interpolation frame from a current field video, to be interpolated, by a line averaging method;

(b) setting a plurality of edge directions with respect to a pixel, to be interpolated, in the intermediate interpolation frame, and deriving an average of absolute mismatch values for pixels grouped by measurement windows determined by each of the set edge directions, thereby deriving an absolute mismatch value for the edge direction;

(c) repeatedly executing the absolute mismatch value deriving procedure (b) for all the set edge directions, thereby deriving respective absolute mismatch values for all the set edge directions;

(d) detecting edge direction information associated with an edge direction, exhibiting a minimum mismatch value, among the edge directions, and interpolating all pixels, arranged within the measurement windows determined in the procedure (b), in the same direction based on the detected edge direction; and (e) comparing a predetermined number of edge directions (four edge directions), exhibiting mismatch values less than other edge directions, among all the set edge directions with the other edge directions in terms of mismatch values, thereby determining an accuracy of the detected edge direction information; and (f) determining whether or not the deinterlacing result is applicable, based on the result of the determination in the procedure (e).

Figure 1:
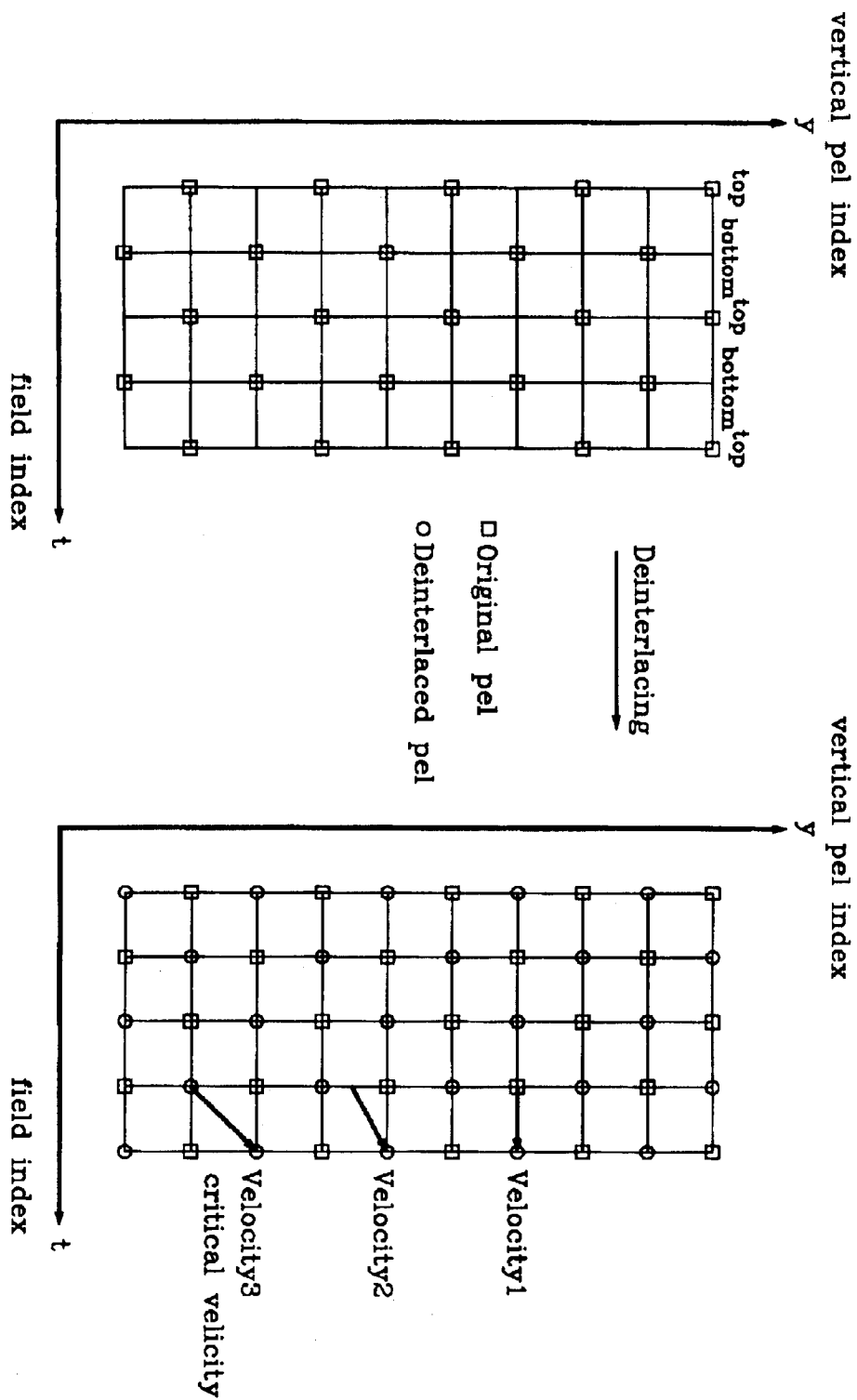
FIG. 1 is a view illustrating a deinterlacing process for video signals.
Figure 2A:
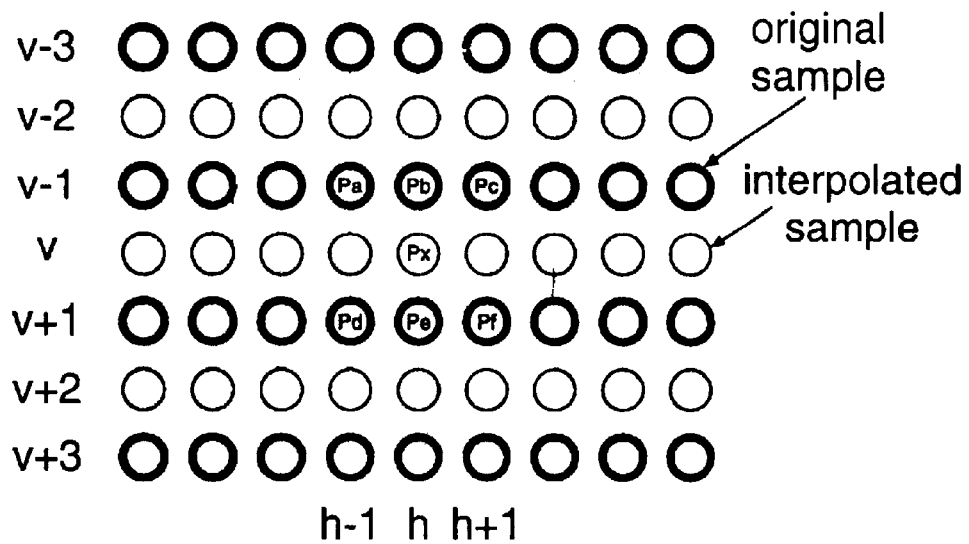
FIG. 2a is a view illustrating a procedure for detecting an edge direction in a general EDI.
Figure 2B:
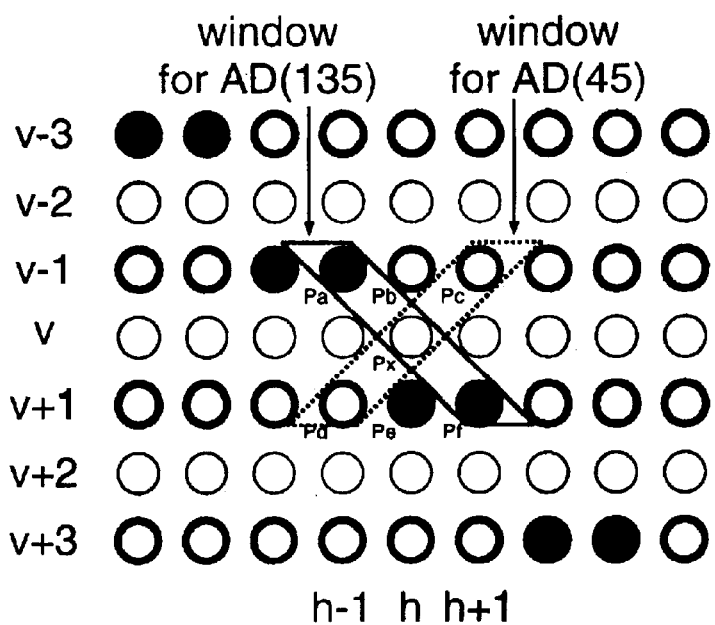
FIG. 2b is a view illustrating an example in which an error is generated upon detecting an edge direction in the general EDI.
Figure 3:
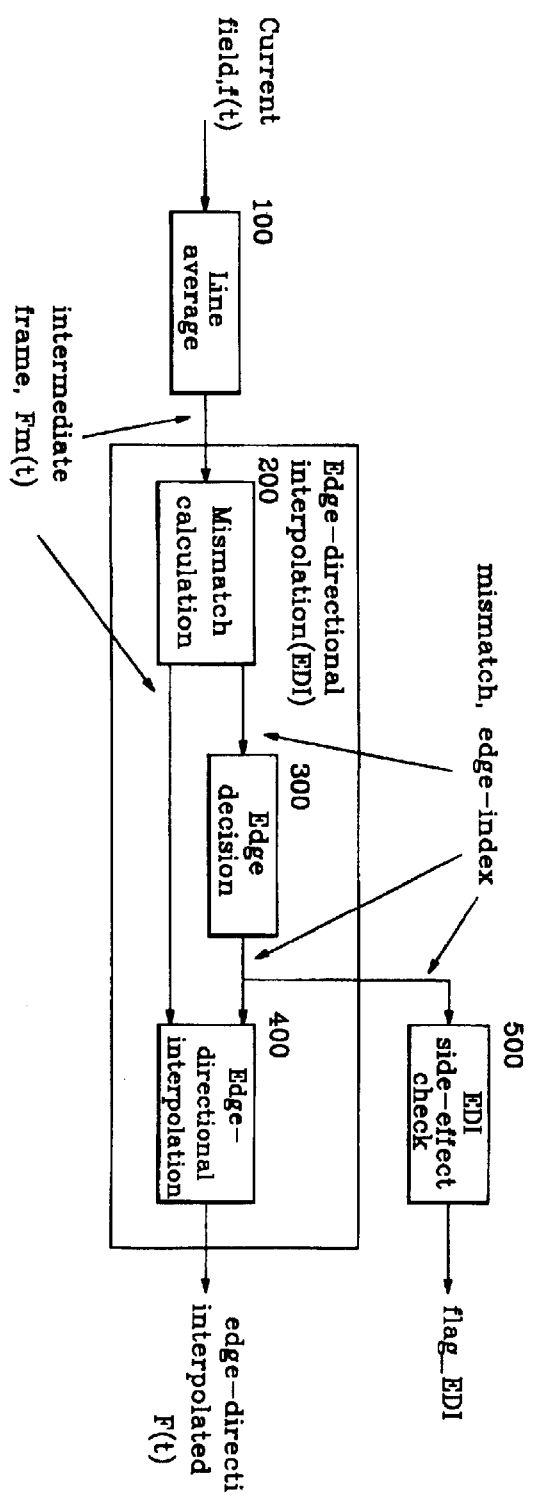
FIG. 3 is a block diagram illustrating an apparatus for carrying out a deinterlacing method for video signals of an interlaced scan format based on an EDI according to the present invention.
Figure 4:
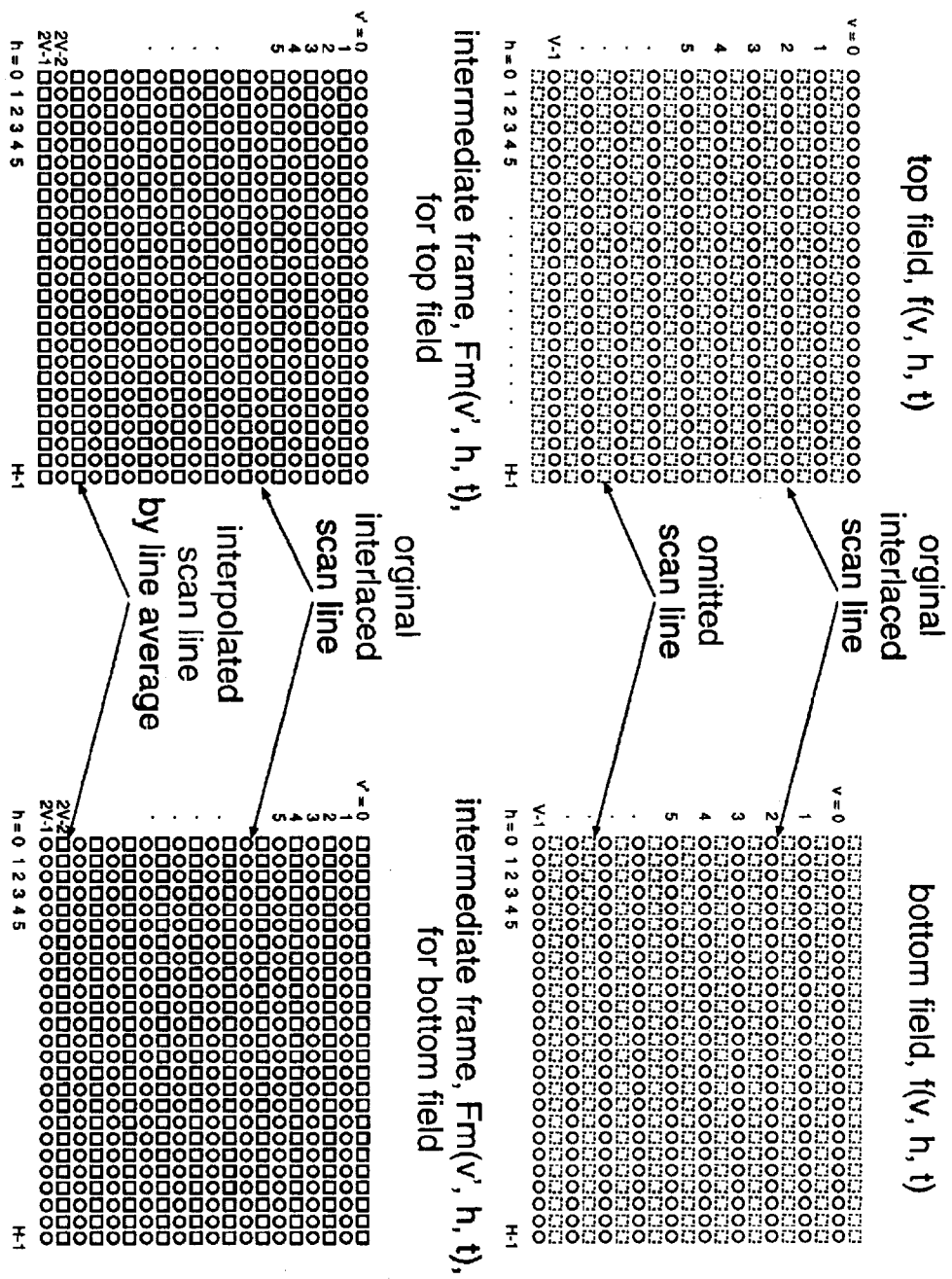
FIG. 4 is a view illustrating a procedure for forming an intermediate frame in accordance with the present invention.

FIG. 3 is a block diagram illustrating a deinterlacing system for carrying out the deinterlacing procedure according to the present invention.

As shown in FIG. 3, this deinterlacing system includes a line average filter section 100 for forming an intermediate frame Fm(t) in accordance with a line averaging procedure for a current field f(t), an edge direction mismatch calculation section 200 for setting a plurality of edge directions with respect to a pixel, to be interpolated, in the intermediate frame Fm(t), and calculating absolute mismatch values in the set edge directions, respectively, and an edge direction decision section 300 for comparing the calculated absolute mismatch values with one another, thereby detecting an edge direction, exhibiting a minimum mismatch value, among the set edge directions while outputting a predetermined number of edge direction information respectively associated with absolute mismatch values, less than the other absolute mismatch values, among the absolute mismatch values respectively calculated for the set edge directions, along with respective absolute mismatch values of the set edge directions. The deinterlacing system also includes an EDI section 400 for interpolating the intermediate frame, based on the edge direction information outputted from the edge direction decision section 300, and an EDI side-effect check section 500 for receiving the edge direction information and respective absolute mismatch values of the set edge directions from the edge direction decision section 300, and determining an accuracy of the detected edge direction, based the received information and values, and outputting a value "flag_EDI" adapted to determine, based on the determined accuracy, whether or not the deinterlacing result from the EDI section 400 is applicable.

Now, the deinterlacing procedure for video signals based on the EDI according to the present invention will be described in detail, in conjunction with FIG. 3.

Referring to FIG. 3, an input video signal f(v, h, t) of a current field is a video signal of an interlaced scan format to be converted into a progressive scan format.

Here, "v" and "h" are parameters indicative of vertical and horizontal coordinate values, respectively, and , and "t" is a parameter indicative of time.

In accordance with the present invention, the input video signal f(v, h, t) is first applied to the line average filter section 100 which, in turn, generates an intermediate frame Fm(v', h, t), based on the input video signal f(v, h, t).

As shown in FIG. 5c, the intermediate frame Fm(v', h, t) has a form obtained by interpolating neighboring scan lines of the original interlaced video signal by a line averaging method.

Since the intermediate frame Fm(v', h, t) is formed by vertically averaging scan lines, it has a form in which an omitted scan line between neighboring scan lines of the original interlaced video signal is interpolated by a line average of those neighboring scan lines.

The temporarily-interpolated data of such an intermediate frame has the same direction as the original edge direction.

The use of such an intermediate frame means that original interlaced scan lines up to 4 in number can be used to detect an edge. Accordingly, it is possible to more accurately detect the edge.

Once the intermediate frame is formed in accordance with the operation of the line average filter section 100, the edge direction mismatch calculation section 200 calculates mismatch values associated with respective edge directions, using the intermediate frame.

FIG. 5a is a view illustrating an example in which 33 edge directions are detected for a video region containing a pixel Px to be interpolated, the video region having 5 vertical scan lines and a maximum of 32 pixels in a horizontal direction. The 33 edge directions are represented by indices l of −16 to +16, respectively.

FIG. 5b is a view illustrating a calculation for mismatch values for an optional one of the edge directions set as mentioned above, for example, the edge direction corresponding to an index of −12 (l=−12).

This mismatch calculation procedure will now be described in conjunction with FIGS. 5a and 5b.

First, 33 edge directions are set with respect to a pixel Px to be interpolated, as shown in FIG. 5a. Mismatch values in the 33 edge directions are then calculated, respectively.

As shown in FIG. 5b, the calculation of mismatch values in each edge direction is achieved by repeatedly conducting, for measurement windows overlapping with the edge direction, a procedure for deriving respective absolute values of mismatches in the edge direction among pixels arranged within one measurement window.

An average edge-directional mismatch value is derived by summing all mismatch values respectively derived for all edge directions in accordance with the procedure of FIG. 5b, and then dividing the resultant sum by the number of the edge directions.

Thus, the calculation of edge-directional mismatches according to the present invention provides values capable of representing an accurate edge direction even for a video containing noise signal components because it is achieved using a plurality of pixels arranged within a measurement window, and the value obtained by the calculation has the form of an average value.

Also, in accordance with the present invention, the possibility of mistaking video portions, other than edge portions, for edge portions is reduced.

Moreover, the edge direction can be finely represented because it is divided into 33 directions.

Thereafter, the edge direction mismatch calculation section 200 outputs the intermediate frame data, used for the mismatch calculation, to the EDI section 400 while outputting respective mismatch values, calculated for the 33 directions, to the edge direction decision section 300.

The edge direction decision section 300 compares the mismatch values in the 33 directions with one another, and outputs, to the EDI section 400, index information associated with the direction exhibiting a minimum mismatch. The edge direction decision section 300 also outputs, to the side-effect check section 500, indices respectively associated with four directions, exhibiting mismatches less than other directions, among the 33 direction, along with respective mismatch values of the 33 directions.

Since side effects are detected using a plurality of mismatch values and direction information associated therewith in accordance with the present invention, it is possible to minimize an occurrence of side effects when an edge direction other than the actual direction is detected. The detailed operation of the side-effect check section 500 will be described hereinafter.

The EDI section 400 receives, from the edge direction decision section 300, the index associated with the direction exhibiting a minimum mismatch, and substitutes the interpolated pixels of the previously formed intermediate frame by pixels, newly interpolated in the edge direction corresponding to the index.

The EDI section 400 conducts an interpolation in the same direction for all pixels arranged within measurement windows set by each edge direction index, so that it can accurately recover edges.

Meanwhile, the side-effect check section 500 receives, from the edge direction decision section 300, respective indices of four directions, exhibiting mismatch values less than those of other directions, among the 33 directions, and respective mismatch values of the 33 directions, and checks an accuracy of the detected direction information, based on the received data.

In order to check an accuracy of the detected direction information, the less mismatch values previously derived and the directions respectively corresponding to those mismatch values satisfy three certain conditions.

These three conditions are based on the fact that the pixels of an actual video exhibit a high correlation in an edge direction. Assuming that the direction exhibiting a minimum mismatch corresponds to an edge direction, the three conditions are as follows:

First, the four edge directions exhibiting less mismatches should be similar to one another;

Second, differences among those less mismatches of the four edge directions are small; and Third, each of the four edge directions exhibits a large mismatch difference from other directions.

Figure 6:
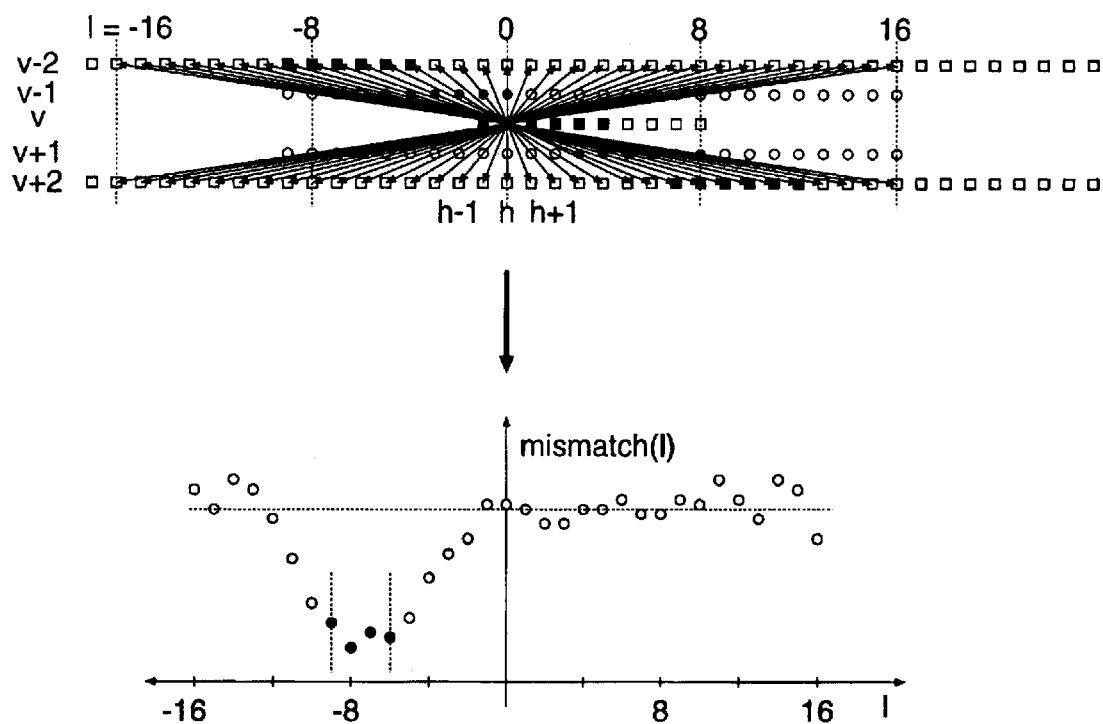
FIG. 6 is a view illustrating a typical distribution of mismatch values in accordance with the present invention.

FIG. 6 illustrates a distribution of mismatch values satisfying the above mentioned three conditions.

In order to identify the above mentioned three conditions, it is necessary to use values "avg_mismatch", "mismatch_diff_avg", "mismatch_diff_nbr", and "true_dist[1]", "true_dist[2]", and "true_dist[3]" in addition to the four less mismatch values "mismatch[0]", "mismatch[1]", "mismatch[2]", and "mismatch[3]".

These values are defined as follows:

mismatch[0]: minimum mismatch value;

mismatch[0] ≦mismatch[1] ≦mismatch[2] ≦mismatch[3];

avg_mismatch: average of mismatch values other than the minimum mismatch value;

mismatch_diff_avg; |avg_mismatch−mismatch[0]|; and mismatch-diff_nbr: |mismatch[0]−mismatch [1]|

When the minimum mismatch value exhibits an increased difference from the average of the mismatch values other than the minimum mismatch value, the probability that the direction associated with the minimum mismatch value "mismatch[0]" corresponds to the edge direction is increased. This is because the pixels of an actual video exhibit a high correlation in an edge direction.

Also, the value "mismatch_diff_nbr" serves as a reference for measuring an accuracy of the selected edge direction. This value "mismatch_diff_nbr" is derived by calculating the difference between the minimum mismatch value and the second minimum mismatch value. When the value "mismatch_diff_nbr" is higher, the probability that the direction associated with the minimum mismatch value "mismatch[0]" corresponds to the edge direction is increased.

The values "true_dist[1]", "true_dist[2]", and "true_dist[3]" are numeric values indicative of respective differences of the directions corresponding to the values "mismatch[1]", "mismatch[2]", and "mismatch[3]" from the direction corresponding to the minimum mismatch value "mismatch[0]", taking horizontal lines into consideration.

Even though "mismatch_diff_nbr" is not higher, if "true−dist[1]", "true_dist[2]" or "true¯dist[3]" are smaller than certain threshold value, the probability that the direction associated with the minimum mismatch value "mismatch[0]" corresponds to the edge direction is increased.

In the indexing method of the present invention, an increased index difference is calculated for the indices of minimum mismatch directions approximating to −16 or +16, in spite of the fact that those indices actually correspond to the substantially identical directions, respectively, that is, are similar to a horizontal line. In other words, there may be a problem in that those indices are determined to correspond to those of different directions, respectively.

In order to correct such an error, index differences are re-adjusted, taking horizontal lines into consideration, as expressed in the following Equation 3:

$$\text{ture\_dist}[1]=\min(|1[0]-1[1]|, |1[0]-1[LH]|+(|1[1]-1[RH]|, |1[0]-1[RH]|+|1[1]-1[LH]|)$$

$$\text{ture\_dist}[2]=\min(|1[0]-1[2]|, |1[0]-1[LH]|+(|1[2]-1[RH]|, |1[0]-1[RH]|+|1[2]-1[LH]|)$$

$$\text{ture\_dist}[1]=\min(|1[0]-1[3]|, |1[0]-1[LH]|+(|1[3]-1[RH]|, |1[0]-1[RH]|+|1[3]-1[LH]|) \qquad \text{[Equation 3]}$$

In Equation 3, "l[0]", "l[1]", "l[2]", and "l[3]" represent respective indices indicative of edge directions corresponding to the mismatch values "mismatch[0]", "mismatch[1]", "mismatch[2]", and "mismatch[3]" whereas "l[LH]" and "l[RH]" represent respective indices indicative of horizontal lines corresponding to the minimum and maximum values, that is, −17 and +17.

The reference for finally determining an accuracy of the selected edge direction using the parameters defined as above can be defined, using the C program language, as follows:

```
if(abs(1[0]) < MO)
{
        if((mismatch[0] < M1) && (mismatch_diff_
            avg >
mismatch_diff_th_curve (mismatch[0])) && ((mismatch_diff_nbr > M2) ||
((mismatch_diff_avg > mismatch_diff_th-curve(mismatch[0]) + M3) &&
(true_dist[1] <M4) && (true_dist[2] <M5)) || ((true_dist[1] < M6) &&
(true_dist[2] <M7) && (true_dist[3] <M8))))
                        flag_EDI = TRUE;
            else
                        flag_EDI = FALSE;
}
else
{
    if((mismatch[0] < M1) && (mismatch_diff avg > mismatch_diff_th_curve
(mismatch[0])) && ((mismatch_diff_nbr > M2) || (mismatch_diff_avg >
mismatch_diff_th-curve(mismatch[0]) + M3) && (true_dist[1] <M4) &&
(true_dist[2] <M5)) || ((true_dist[1] <M9) && (true_dist[2] <M10) &&
(true_dist[3] <M11))))
                        flag_EDI = TRUE;
            else
                        flag_EDI = FALSE;
}
``` where, "&&" represents a logic AND, and "||" represents a logic OR.

In the above reference, the condition of "|I(0)|" is a condition for determining whether the direction exhibiting a minimum mismatch approximates to a vertical direction or a horizontal direction. This condition is adapted to relax the edge determination reference when the direction exhibiting a minimum mismatch approximates to a vertical direction.

This is based on the fact that since the sampling toward a lower frequency does not involve any aliasing, edge information corresponding to a direction approximating to a vertical direction can be relatively accurately calculated even in video signals of an interlaced scan format.

In this case, a function of "mismatch[0]" is used as a comparison value for the value "mismatch_diff_avg". This function has a form exhibiting an increase in value at a higher value of "mismatch[0]".

This is based on the fact that the probability of accurately detecting the edge direction is increased at a lower value of "mismatch[0]".

A flag "flag_EDI", which is a measurement for the determination of whether or not the detected edge information is correct, is outputted along with edge-directional interpolated pixels in accordance with the above procedure. Based on the outputted flag "flag_EDI", it is determined whether or not the results of the deinterlacing process based on the EDI are to be applied.

For a higher-level interpolator, which receives the value "flag_EDI" to determine whether or not the detected edge information is correct, that is, whether or not a correct deinterlacing procedure has been conducted, diverse interpolators such as MCI interpolators or simple filters may be used in addition to an EDI interpolator according to the present invention. In this case, those interpolators may conduct a compensative interpolation based on the value "flag_EDI".

As apparent from the above description, the present invention provides an interlacing method based on an edge-directional interpolation which involves forming a temporarily-interpolated intermediate frame by a line average filtering, deriving a plurality of absolute mismatch values, respectively associated with a plurality of edge directions, from the intermediate frame, selecting an edge direction, exhibiting a minimum mismatch value, among those edge directions, and conducting an EDI procedure for a video signal, based on direction information associated with the selected edge direction. In accordance with this method, it is possible to achieve a deinterlacing for video signals by virtue of an accurate and reliable edge direction detection as compared to that of the conventional EDI method.

In accordance with the present invention, it is also determined whether or not the detected edge direction is reliable, thereby determining whether or not the deinterlacing results are applicable. Thus, a reliable EDI deinterlacing method can be provided in accordance with the present invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A deinterlacing method for video signals based on an edge-directional interpolation comprising:
    (a) forming an intermediate video frame from a video of a current field;
    (b) setting a plurality, of edge directions with respect to a pixel in the intermediate video frame, and calculating mismatch values respectively associated with the set edge directions;
    (c) comparing the mismatch values of the set edge directions with one another and determining an edge direction among the set edge directions;
    (d) calculating an interpolation value of the pixel using information about the edge directions along with the intermediate video frame;
    (e) checking an accuracy of the determined edge direction using the information about the edge directions and determining whether the determined edge direction involves side effects; and
    (f) if it is determined that the determined edge direction is reliable, then selecting the interpolation pixel value, associated with the determined edge direction, as a deinterlacing value.

2. The deinterlacing method according to claim 1, wherein the intermediate video frame is formed by a line average for the video of the current field.

3. The deinterlacing method according to claim 1, wherein the edge directions correspond to 33 directions extending from the pixel to be interpolated, respectively.

4. The deinterlacing method according to claim 1, wherein the unit of the interpolation corresponds to the unit of a pixel group consisting of a plurality of pixels.

5. The deinterlacing method according to claim 1, wherein the calculation of the mismatch value associated with each of the set edge directions is carried out by calculating mismatch values in the edge direction using a window containing the pixel to be interpolated, the window having a first plurality of vertical scan lines and a second plurality of pixels in a horizontal direction.

6. The deinterlacing method according to claim 1, wherein the calculation of the mismatch value associated with each of the set edge directions is carried out by deriving an average value of pixels arranged in a window.

7. The deinterlacing method according to claim 1, wherein the determination of the edge direction to be the actual edge direction is carried out by comparing respective mismatch values associated with the edge directions set with respect to the pixel with one another, and determining, as candidates of the actual edge direction, direction indices respectively associated with four edge directions exhibiting mismatch values less than other edge directions.

8. The deinterlacing method according to claim 1, wherein the calculation of the interpolation value of the pixel is carried out using direction indices respectively associated with four edge directions exhibiting mismatch values less than other edge directions along with the intermediate video frame, while using pixels of the same direction among all pixels arranged in a window defined by the direction indices.

9. The deinterlacing method according to claim 1, wherein the calculation of the interpolation value of the pixel is carried out using direction indices respectively associated with four edge directions exhibiting mismatch values less than other edge directions along with respective mismatch values calculated for the set edge directions, and the determination of whether the determined edge direction involves side effects is carried out based on similarities of four edge directions exhibiting mismatch values less than other edge directions, differences among the less mismatch values associated with the four edge directions, and differences of the less mismatch values from respective mismatch values associated with the remaining edge directions.

10. The deinterlacing method according to claim 9, wherein the determination of whether the determined edge direction involves side effects is carried out using direction indices respectively obtained by re-adjusting the direction indices associated with the four edge directions exhibiting less mismatch values taking horizontal lines into consideration.

11. The deinterlacing method according to claim 10, wherein the re-adjustment of the indices is carried out for indices respectively associated with edge directions exhibiting a second, a third, and a fourth minimum mismatch value while taking into consideration a difference of each of the indices from an index associated with the first minimum mismatch value, a difference of the index associated with the first minimum mismatch value from each of indices respectively representing vertical lines corresponding to maximum and minimum index values, and a difference of each of the indices, associated with the edge directions exhibiting the second through fourth minimum mismatch values, from each of the indices respectively representing the vertical lines corresponding to the maximum and minimum index values.

12. The deinterlacing method according to claim 5, wherein the first plurality of vertical scan lines is 5 and the second plurality of pixels is a maximum of 32.

13. The deinterlacing method according to claim 1, wherein forming the intermediate video frame generates temporary data for non-existing pixels using existing pixel data, and wherein calculating mismatch values uses the generated temporary data.

14. An edge-directional interpolation method, comprising:

forming an intermediate video frame by generating temporary data for non-existing pixels using existing pixel data;

setting a plurality of edge directions with respect to a non-existing pixel;

calculating mismatch values respectively associated with the plurality of edge directions using the generated temporary data;

comparing the mismatch values calculated;

determining an edge direction based on the comparison of the mismatch values calculated;

calculating an interpolation value of the non-existing pixel using information about the determined edge direction and the generated temporary data;

checking an accuracy of the determined edge direction using the information about the plurality of edge directions; and selecting the calculated interpolation value for the non-existing pixel if the accuracy of the determined edge direction indicates a reliable determination.

15. The method of claim 14, wherein the intermediate video frame is formed by line averaging using the existing pixel data and the calculation of the mismatch values respectively associated with the plurality of edge directions uses a window having at least 5 vertical scan lines and at least 32 pixels in a horizontal window.

16. The method of claim 14, wherein the calculation of the mismatch values respectively associated With the plurality of edge directions uses an average value of a plurality of pixels arranged in a horizontal window.

17. The method of claim 14, wherein the accuracy check of the determined edge direction comprises a first comparison of the calculated mismatch values respectively associated with the plurality of edge directions with one another and a second comparison of a subset of the calculated mismatch values respectively associated with the plurality of edge directions.

18. An edge directional interpolation system, comprising:

intermediate frame means for forming an intermediate video frame from a current field;

mismatch calculation means for calculating a plurality of mismatch values associated with a plurality of edge directions using the intermediate video frame;

edge decision means for determining an edge direction from the plurality of edge directions based on calculations of the mismatch calculation means, the edge decision means determining, as candidates of the edge direction, a plurality of possible edge directions exhibiting mismatch values less than other edge directions;

edge directional interpolation means for calculating an interpolation value of a non-existing pixel; and accuracy checking means for checking an accuracy of the interpolation value using the calculations of the mismatch calculation means.

19. The system of claim 18, wherein the intermediate frame means forms the intermediate video frame by using existing pixel data from the current field to generate pixel data for a plurality of non-existing pixels.

20. The system of claim 18, wherein the mismatch calculation means calculates mismatch values using an average value of a plurality of pixels arranged in a horizontal window.

21. The system of claim 18, wherein the plurality of possible edge directions exhibiting mismatch values less than other edge directions is four.

22. The system of claim 18, wherein the edge directional interpolation means uses direction indicies respectively associated with the plurality of possible edge directions along with the intermediate video frame and pixels of the same direction among all the pixels arranged in a window defined by the direction indicies.

23. The system of claim 22, wherein the edge directional interpolation means determines whether the edge direction involves side effects based on similarities of the plurality of possible edge directions, differences among the mismatch values associated with the plurality of possible edge directions, and differences of mismatch values associated with remaining edge directions.

* * * * *